O. EPPENSTEIN.
HORIZONTAL TELEMETER.
APPLICATION FILED AUG. 30, 1915.
1,166,824.
Patented Jan. 4, 1916.
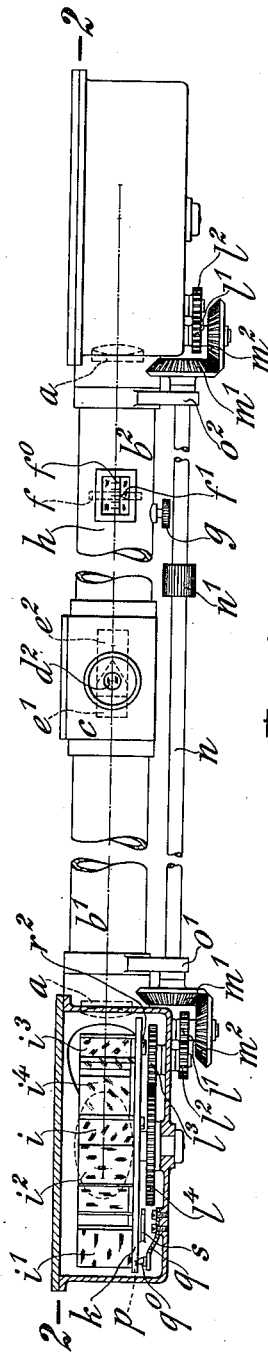
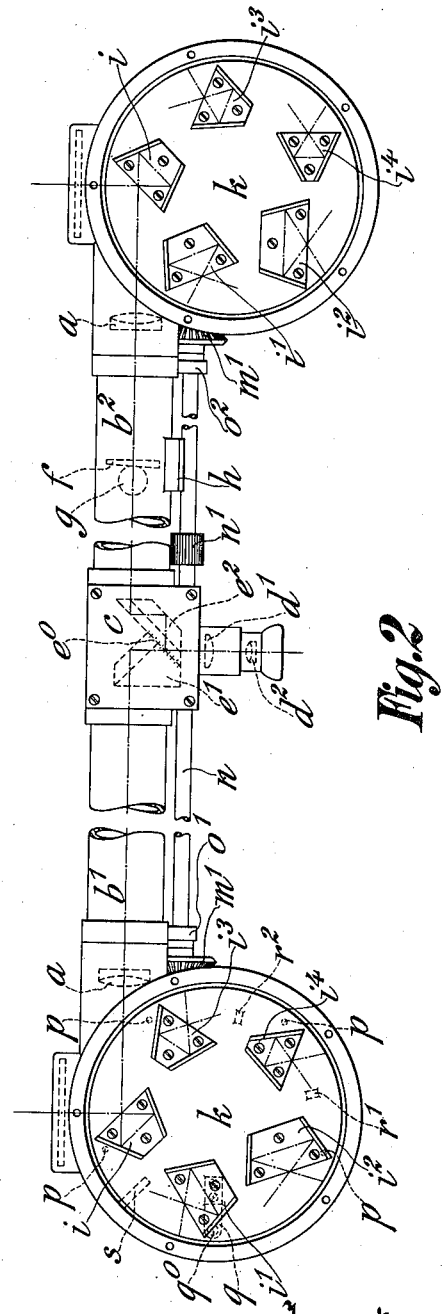
Fig. 1
Fig. 2
Inventor
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

HORIZONTAL TELEMETER.

1,166,824. Specification of Letters Patent. Patented Jan. 4, 1916.

Application filed August 30, 1915. Serial No. 48,129.

*To all whom it may concern:*

Be it known that I, OTTO EPPENSTEIN, a citizen of the German Empire, residing at Jena, Germany, have invented a new and useful Horizontal Telemeter, of which the following is a specification.

The present invention relates to the horizontal telemeters with the base-line in the instrument, forming the subject of Patent 1,118,337. In the telemeters according to the said patent each of the two ray pencil systems belonging to the ends of the base-line passes besides through the respective objective reflecting system through a deflecting device of variable deflection, which permits of displacing parallel to the base-line the image formed from the pencil system and presented to the observer, and these two deflecting devices are coupled in such a manner that, for the purpose of altering the direction of outlook, the two images can be displaced jointly by a small amount in the direction of the base-line. Such a joint displacement of the two images results in a disadjustment of the instrument, when the amount, by which the images are displaced, is not the same for both images. Hence, if the instrument is to give correct readings for any direction of outlook, it is necessary for the parts of the instrument, serving for the joint displacement of the images, to be of an accuracy that can only be realized with difficulty in practice when manufacturing such telemeters. These difficulties certainly may be avoided, by using not one pair of deflecting devices of variable deflection, but several pairs of deflecting devices having a different but invariable deflection. For displacing the images, one such pair of deflecting devices can then be replaced by another pair, whereby, it is true, the displacement of the images is caused to proceed by jerks.

According to the present invention the deflection of the ray pencil systems required for the displacement of the images is effected not by special, deflecting devices, which are separate from the objective reflecting systems, but by the said deflecting devices themselves, and for this purpose the telemeter contains at either end of the base-line a number of objective reflecting systems differing from one another as regards their deflection, which may be introduced one after another into the path of the rays, the sum derived from the angle of deflection of an objective reflecting system at one end of the base-line and the angle of deflection of the objective reflecting system belonging to it at the other end of the base line being the same for all the pairs of objective reflecting systems. In such a telemeter the direction of outlook is altered by passing from one pair of objective reflecting systems to another pair.

If a telemeter, in which for the purpose of taking a measurement the image of an object, the range of which is to be found, is to be brought to a particular part of the image-field, e. g. next to the image of the part of a stereoscopic distance scale appertaining thereto, be fitted in accordance with the invention, it is necessary, as, just through the interchange of the objective reflecting systems, the direction of outlook can be altered only by jerks, to journal the instrument in such a manner as to be rotatable in the plane of triangulation by a small amount, should it not be deemed preferable to fit the telemeter in addition with a pair of deflecting devices, which is separate from the objective reflecting systems and allows within comparatively narrow limits of an additional constant displacement of the images.

The annexed drawing shows a constructional form of a coincidence telemeter according to the invention, in which the two images presented to the observer are erect, Figure 1 being an elevation in part section and Fig. 2 a plan view.

The objective lenses $a$, $a$ are mounted each in one of the tubes $b^1$ and $b^2$, which are connected together by a central body $c$ containing an ocular $d^1$, $d^2$ and a separating prism system $e^1$, $e^2$. The cement layer $e^0$ between the two prisms $e^1$ and $e^2$ is formed as to its upper half as a separating layer reflecting both ways. A glass wedge $f$, which can be displaced by means of a milled head $g$, serves for measuring. The scale $f^0$, which is fixed to the wedge $f$, and the index $f^1$ are visible through a window $h$. In front of each of the objective lenses $a$ there is located a group of five optical squares $i$, $i^1$, $i^2$, $i^3$, $i^4$, each square having a different deflection and each group being fixed on a plate $k$, which is parallel to the plane of triangulation, in such a manner that by rotating the plate about an axis perpendicular to the said plane each of the five optical squares may be brought into its effective position. By means of toothed wheels $l^1$, $l^2$, $l^3$, $l^4$ and of two pairs of bevel wheels $m^1$, $m^2$, of which the wheels $m^1$ are fixed on a shaft $n$ journaled in bodies $o^1$ and $o^2$ fixed to the tubes $b^1$ and $b^2$, the two plates $k$ are coupled together in such a manner that they rotate in opposite directions, when the shaft $n$ is rotated by means of a milled head $n^1$, and that an optical square belonging to one end of the base-line always becomes effective simultaneously with one belonging to the other end. The size of the angles of deflection of the optical squares is in the present case so chosen that the sum derived from the angle of deflection of a reflecting system at the one end of the base-line and the angle of deflection of the reflecting system belonging to it at the other end of the base-line amounts for each of the five pairs of optical squares to 180°. The optical squares $i$, which are in the drawing in their effective position, each deflect the entering ray pencil system by 90°; hence, when they are in the said position, the direction of outlook is approximately perpendicular to the base-line of the telemeter. The optical squares are so disposed on the plates $k$, that those optical squares (e. g., $i^1$ and $i^2$ of the left-hand disk and $i^3$ and $i^4$ of the right-hand disk), which can be rendered operative by a rotation of the shaft $n$ in one direction from out of the position, in which the disks $k$ occupy the position shown in the drawing, cause an alteration of the direction of outlook in one sense, and those optical squares (corresponding to the above assumption $i^3$ and $i^4$ of the left-hand disk and $i^1$ and $i^2$ of the right-hand disk), which can be made operative by a rotation of the shaft $n$ in the opposite direction to the former rotation, cause an alteration of the direction of outlook in the other sense. The angle of deflection peculiar to each optical square is so chosen that, on a rotation of the disks $k$ out of the position shown taking place, the direction of outlook becomes more and more inclined (to one side or the other) to the base-line of the instrument. The left-hand disk $k$ is provided with five notches. A spring $q$ causes a conical catch $q^0$, which it controls, to engage with one of the said notches each time that one of the five left-hand optical squares occupies such a position that it is traversed symmetrically by the axial ray passing through it. Two stops $r^1$ and $r^2$ on the left-hand disk $k$ coact with a stop $s$ and limit the rotatory movement of the optical squares both ways.

I claim:

In a horizontal telemeter a base-line within the instrument, a measuring device, an ocular system, an ocular reflecting system, at either side of the said ocular reflecting system an objective lens system, at either end of the said base-line a group of objective reflecting systems, means for bringing the said reflecting systems one after another into the path of the rays, each such system having a different deflection to the others and the sum derived from the angle of deflection of an objective reflecting system at one end of the base-line and the angle of deflection of the objective reflecting system belonging to it at the other end of the base-line being the same for all pairs of objective reflecting systems.

OTTO EPPENSTEIN.